(12) United States Patent
Iida

(10) Patent No.: US 6,171,675 B1
(45) Date of Patent: Jan. 9, 2001

(54) UV-CURABLE ADHESIVE COMPOSITION, METHOD OF PREPARING OPTICAL DISC AND OPTICAL DISC PRODUCED THEREBY

(75) Inventor: Takafumi Iida, Himeji (JP)

(73) Assignee: Nagase-Ciba Ltd. (JP)

( * ) Notice: Under 35 U.S.C. 154(b), the term of this patent shall be extended for 0 days.

(21) Appl. No.: 09/315,040

(22) Filed: May 20, 1999

(51) Int. Cl.$^7$ .............................. B32B 3/02; C08G 75/04; C08L 75/16

(52) U.S. Cl. ..................... 428/64.4; 428/65.2; 522/167; 522/171; 522/172; 522/180

(58) Field of Search ..................................... 522/180, 171, 522/182, 167, 172; 428/64.1, 64.2, 64.4, 65.2

(56) References Cited

U.S. PATENT DOCUMENTS

| | | | |
|---|---|---|---|
| 3,697,395 | * | 10/1972 | Kehr et al. . |
| 4,274,933 | * | 6/1981 | Kamada et al. . |
| 4,438,190 | * | 3/1984 | Ishimaru et al. . |
| 4,587,313 | * | 5/1986 | Ohta et al. . |
| 4,612,384 | * | 9/1986 | Omura et al. . |
| 4,657,983 | * | 4/1987 | Skiscim . |
| 5,321,053 | * | 6/1994 | Hino et al. . |
| 5,698,285 | * | 12/1997 | Kojima . |
| 5,824,385 | * | 10/1998 | Itoigawa et al. . |

* cited by examiner

Primary Examiner—Susan W. Berman
(74) Attorney, Agent, or Firm—Lorusso & Loud

(57) ABSTRACT

An adhesive composition including (a) a polymerizable (meth)acrylate compound having a phosphate group, (b) a thiol compound, (c) a polymerizable compound having a double bond and having no phosphate group, and (d) a photopolymerization initiator. The adhesive composition is suitably used for fabrication of optical discs.

10 Claims, 1 Drawing Sheet

UV-CURABLE ADHESIVE COMPOSITION, METHOD OF PREPARING OPTICAL DISC AND OPTICAL DISC PRODUCED THEREBY

BACKGROUND OF THE INVENTION

This invention relates generally to an adhesive composition and, more specifically, to a UV-curable adhesive composition useful for fabricating an optical disc. The present invention also pertains to a method of preparing an optical disc using the above adhesive composition and to an optical disc produced thereby.

Various optical discs such as of a read-only (RO) type, a write-once (WO) type or a rewritable (RW) type are known. These optical discs have a transparent substrate on which an optical information recording layer is formed by, for example, sputtering or vacuum deposition of a metal or metal oxide. Recently, optical discs, such as digital video discs (DVD), having two or more recording layers were proposed. Such a multi-recording-layer optical disc is generally prepared by bonding two optical discs, each having a transparent substrate and one or more optical information recording layers, together.

One known UV-curable adhesive composition for bonding optical discs contains a polymerizable unsaturated compound, such as (meth)acrylate, and a polymerization initiator. When the optical discs to be bonded have a metal, alloy or metal oxide layer as the reflective layer, however, the known adhesive composition fails to have a satisfactory bonding strength.

SUMMARY OF THE INVENTION

It is, therefore, an object of the present invention to provide a UV-curable adhesive composition suitable for bonding metal, alloy or metal oxide surfaces to each other.

Another object of the present invention is to provide a UV-curable adhesive composition suitable for bonding a metal, alloy or metal oxide surface to a plastic surface.

It is a further object of the present invention to provide a UV-curable adhesive composition of the above-mentioned type which shows a high bonding strength and which does not deteriorate a metal, alloy or metal oxide surface.

It is a special object of the present invention to provide a UV-curable adhesive composition useful for preparation of optical discs.

In accomplishing the foregoing objects, the present invention provides an adhesive composition comprising (a) a polymerizable (meth)acrylate compound having a phosphate group, (b) a thiol compound, (c) a polymerizable compound having a double bond and having no phosphate group, and (d) a photopolymerization initiator.

The present invention also provides a method of preparing an optical disc using the above adhesive composition.

The present invention further provides an optical disc having a layer of the above adhesive composition.

In the present specification, the term "(meth)acrylate" is intended to refer to "acrylate and/or methacrylate". Similarly, the term "(meth)acrylic" is intended to mean "acrylic and/or methacrylic".

BRIEF DESCRIPTION OF THE DRAWING

Other objects, features and advantages of the present invention will become apparent from the detailed description of the preferred embodiments which follows, when considered in light of the accompanying drawing, in which.

DETAILED DESCRIPTION OF THE PREFERRED EMBODIMENTS OF THE INVENTION

Figure 1:
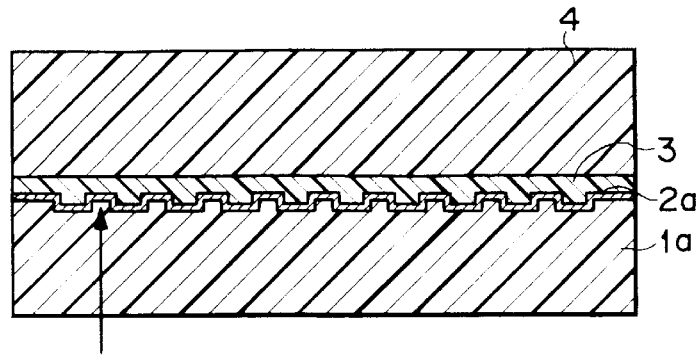
FIG. 1 is a sectional view schematically illustrating an optical disc having a single optical information recording layer according to the present invention.

The adhesive composition according to the present invention contains (a) a polymerizable (meth)acrylate compound having a phosphate group, (b) a thiol compound, (c) a polymerizable compound having a double bond and having no phosphate group, and (d) a photopolymerization initiator.

The polymerizable (meth)acrylate compound (a) may be any conventionally used monomer or oligomer having a $CH_2=CR-COO-$ group (R is a hydrogen atom or a methyl group) and a phosphate group ($>PO(OH)$ or $-PO(OH)_2$).

The compound (a) is preferably a compound represented by the following formula:

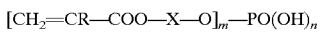

$$[CH_2=CR-COO-X-O]_m-PO(OH)_n$$

wherein R stands for a hydrogen atom or a methyl group, X stands for an organic divalent group, and m and n are integers of 1 or more with the proviso that a total of m and n is 3. The organic divalent group is preferably an alkylene group having 1–8 carbon atoms or $-Y-O-CO-Z-$ where Y and Z stand independently for an alkylene group having 1–8 carbon atoms. Illustrative of suitable compounds (a) are as follows:

(1) $CH_2=CH-COO-CH_2CH_2-O-PO(OH)_2$
(2) $CH_2=CCH_3-COO-CH_2CH_2-O-PO(OH)_2$
(3) $[CH_2=CCH_3-COO-C_2H_4-O(OCOC_5H_{10})O]_2PO(OH)$

The thiol compound (b) may be any compound having a mercapto group (—SH). Thiol compounds having a nitrogen atom or a silicon atom are suitably used for the purpose of the present invention. Examples of the thiol compounds include γ-mercaptopropyltrimethoxysilane, 3-mercaptopropionic acid, methyl mercaptopropionate, octyl mercaptopropionate, methoxybutyl mercaptopropionate, tridecyl mercaptopropionate, butane diol bisthiopropionate, ethylene glycol bisthiopropionate, trimethylolpropane tristhiopropionate, pentaerythritol tetrakisthiopropionate, thioglycolic acid, ammonium thioglycolate, thioglycolic acid monoethanolamine, sodium thioglycolate, methyl thioglycolate, octyl thioglycolate, methoxybutyl thioglycolate, butanediol bisthioglycolate, ethylene glycol bisthioglycolate, trimethylolpropane tristhioglycolate, pentaerythritol tetrakisthioglycolate and isocyanuric acid compounds having —R'—SH group, where R' represents an organic divalent group, bonded to each of the three nitrogen atoms thereof.

Particularly preferred thiol compounds (b) are:

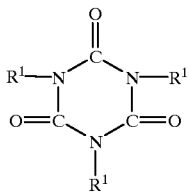

(where $R^1$ is —$C_2H_4O$—CO—$C_2H_4$—SH; this isocyanuric acid compound will be hereinafter referred to as THEIC-BMPA) and HS—$C_3H_6Si(OCH_3)_3$.

By using the compounds (a) and (b) together, the bonding strength of the adhesive composition is synergetically improved while preventing corrosion or deterioration of a metal, alloy or metal oxide surface.

The (meth)acrylate compound (a) and the thiol compound (b) are preferably used in such a proportion as to provide a molar ratio of the mercapto group or groups contained in the thiol compound (b) to the hydroxyl group or groups of the phosphate group or groups of the (meth)acrylate compound (a) of in the range of 0.3:1 to 10:1.

The polymerizable compound (c) may be, for example, monofunctional (meth)acrylates, polyfunctional (meth)acrylates, N-vinyl-2-pyrrolidone, acryloyl morphorine, vinyl imidazole, N-vinyl caprolactum, vinyl acetate, (meth)acrylic acid, (meth)acrylamide, N-hydroxyethylalkylamides, N-hydroxyethylalkylamide alkyl ethers and mixtures thereof. The use of monofunctional (meth)acrylates, polyfunctional (meth)acrylates or a mixture thereof is preferred. Oligomers of monofunctional (meth)acrylates or polyfunctional (meth)acrylates, such as polyester acrylates, polyether acrylates, epoxy acrylates and urethane acrylates, may also be suitably used for the purpose of the present invention.

The monofunctional (meth)acrylate may be a compound represented by the formula:

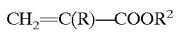

$CH_2$=C(R)—$COOR^2$ wherein R stands for a hydrogen atom or a methyl group and $R^2$ stands for an organic group such as an aliphatic group or an aromatic group which may contain one or more substituents such as a hydroxyl group, an amino group, an ether linkage, an epoxy group or a heterocyclic group. The organic group $R^2$ generally has a carbon number of 1–22. Illustrative of suitable organic groups $R^2$ are a methyl group, an ethyl group, a propyl group, a 2-ethylhexyl group, a nonyl group, a dodecyl group, an octadecyl group, a methoxyethyl group, a butoxyethyl group, a phenoxyethyl group, a nonylphenoxyethyl group, a cyclohexyl group, a benzyl group, a glycidyl group, a 2-hydroxyethyl group, a 3-chloro-2-hydroxypropyl group, a dimethylaminoethyl group, a tetrahydrofurfryl group, an indenyl group and a dicyclopentanyl group.

The polyfunctional acrylate is a polymerizable compound having at least two, preferably 2–6, more preferably 2–3 (meth)acryloyl groups. The polyfunctional acrylate may be an ester of a polyhydric alcohol with (meth)acrylic acid. Examples of the polyhydric alcohols include diols such as 1,3-butylene glycol, 3-methyl-1,5-pentane diol, neopentane glycol, ethylene glycol, polyethylene glycol, propylene glycol, polypropylene glycol and ethylene oxide adducts of bisphenol A; and tri or more polyols such as tris(2-hydroxyethyl)isocyanurate, glycerin, polyglycerin, pentaerythritol and dipentaerythritol.

As the polymerizable compound (c), a mixture of the monofunctional and polyfunctional acrylates is preferably used. The weight ratio of the monofunctional acrylate to the polyfunctional acrylate in the mixture is preferably 10:90 to 90:10, more preferably 20:80 to 80:20.

The polymerizable (meth)acrylate compound (a) is preferably used in an amount of 0.1–5% by weight, more preferably 0.2–3% by weight, based on the total weight of the polymerizable (meth)acrylate compound (a) and the polymerizable compound (c).

The photopolymerization initiator (d) may be any conventionally used initiator. Illustrative of suitable photopolymerization initiators are benzophenone, benzoin isobutyl ether, benzyldimethyl ketal 1-hydroxy-cyclohexyl pheny ketone, α,α'-dimethoxy-α-hydroxyacetophenone, 2,4-diethylthioxanthone, 2-isopropylthioxanthone, 2-chlorothioxanthone, benzyl 2,4,6-trimethylbenzoyldiphenylphosphine oxide, 2-benzyl-2-diemthylamino-1-(4-morpholinophenyl)-butanone-1, bis(2,6-dimethoxybenzoyl)-2,4,4-trimethylpentylphosphine oxide and bis(2,4,6-trimethylbenzoyl)phenylphosphine oxide. The amount of the photopolymerization initiator (d) is generally 0.1–10% by weight, preferably 2–8% by weight, based on the total weight of the polymerizable (meth)acrylate compound (a) and the polymerizable compound (c).

The photopolymerization initiator (d) is suitably used in conjunction with a photosensitizer such as triethylamine, methyldiethanolamine, triethanolamine, diethylaminoacetophenone, p-dimethylaminoacetophenone, ethyl p-dimethylaminobenzoate, isoamyl p-dimethylaminobenzoate, N,N-dimethylbenzylamine and 4,4'-bis(diethylamino)benzophenone.

The adhesive composition according to the present invention may contain one or more customarily employed additives such as a heat polymerization inhibitor, an oxidation preventing agent, a plasticizer, a silane coupling agent, a filler, an antiforming agent, a surfactant and an organic solvent.

The ahdesive composition, which is generally a liquid having a viscosity of 20–2,000 cP at 25° C., is hardened or cured when irradiated with UV rays. The curing is completed within 10 seconds, generally 3–5 seconds, at room temperature.

The adhesive composition is suitably used for bonding various materials such as two metal, alloy or metal oxide surfaces together and a metal, alloy or metal oxide surface with a plastic surface. Particularly, the adhesive composition is preferably used for the fabrication of optical discs of any known system, such as of a read-only (RO) type, a write-once (WO) type or a rewritable (RW) type. Examples of optical discs as applied to digital video discs are schematically illustrated in FIGS. 1–4, in which the same reference numerals designate similar component parts and in which, for the simplicity of illustration, an optical information recording layer is illustrated as being composed of a light reflective layer, e.g. a metal layer formed by sputtering, provided on a grooved surface of a transparent substrate.

Referring to FIG. 1, designated as 1a is a transparent substrate, such as a polycarbonate resin substrate, having a grooved surface on which a reflective layer 2a is deposited by, for example, sputtering a suitable metal, alloy or metal oxide, such as Al, Au or Si. The reflective layer is bonded with a protective layer 4 such as a polycarbonate resin with an adhesive layer 3 which is a layer of the adhesive composition of the present invention cured by irradiation with UV rays. The arrow indicates the direction of a laser beam.

Figure 2:
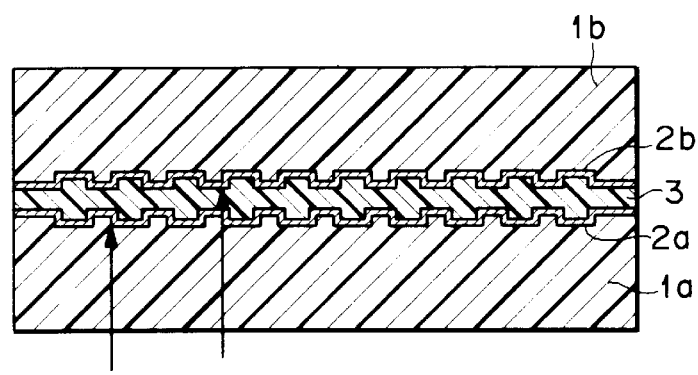
FIG. 2 is a sectional view schematically illustrating an optical disc readable from one side thereof and having two optical information recording layers according to the present invention.

In the optical disc shown in FIG. 2, a pair of a first member having a first transparent substrate 1a and a semi-reflective layer 2a deposited thereon and a second member having a second transparent substrate 1b and a reflective layer 2b deposited thereon are bonded with an adhesive layer 3 which is a layer of the adhesive composition of the present invention cured by irradiation with UV rays. The semi-reflective layer 2a permits a laser beam to pass therethrough.

Figure 3:
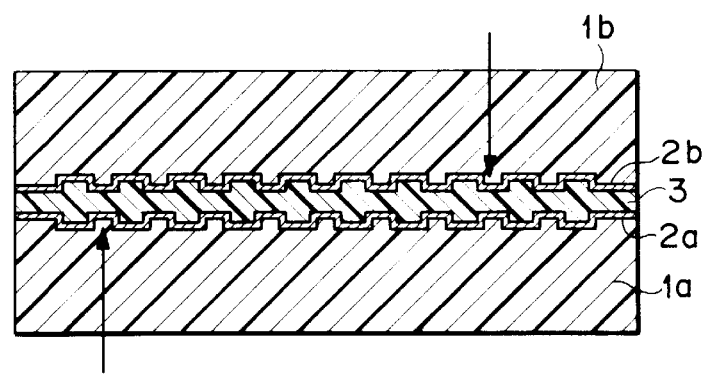
FIG. 3 is a sectional view schematically illustrating a reversible optical disc having two optical information recording layers according to the present invention.

The optical disc shown in FIG. 3 has the same construction as that in FIG. 2 except that layers 2a and 2b are both reflective layers. The optical disc is of a reversible type which is readable on both sides thereof.

Figure 4:
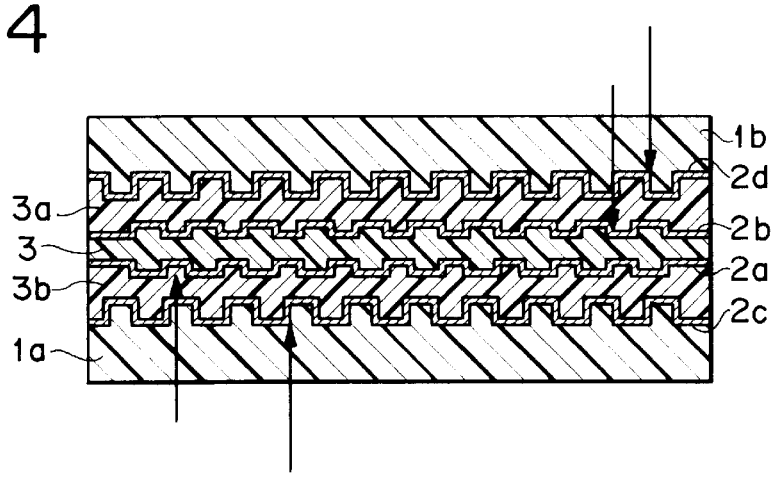
FIG. 4 is a sectional view schematically illustrating a reversible optical disc having four optical information recording layers according to the present invention.

The optical disc shown in FIG. 4 has four reflective layers and is the same as that in FIG. 3 except that semi-reflective layers 2c and 2d and adhesive layers 3b and 3a are interposed between the first substrate 1a and the reflective layer 2a and between the second substrate 1b and the reflective layer 2b, respectively. The adhesive layers 3b and 3a are formed of the adhesive composition of the present invention cured by irradiation with UV rays.

The following examples will further illustrate the present invention.

EXAMPLES 1–3 AND COMPARATIVE EXAMPLES 1–3

Adhesive compositions having the formulations shown in Table 1 were prepared. Each of the adhesive compositions was tested for adhesive strength. The results are summarized in Tables 1-1 and 1-2. The adhesive strength test was performed as follows.

Adhesive Strength Test

An optical disc composed of a polycarbonate (thickness: 0.6 mm) and a reflective layer having a thickness of about 500 Å and formed by sputtering aluminum is cut into 16 sectors of the same size. The surfaces of the aluminum layers are washed with isopropanol. Another optical disc composed of a polycarbonate (thickness: 0.6 mm) and a reflective layer having a thickness of about 200 Å and formed by sputtering gold is cut into 16 sectors of the same size. The surfaces of the gold layers are washed with isopropanol. An adhesive composition is applied onto the cleaned surface of the aluminum layer of one sector, on which another sector is superimposed with the aluminum layer facing the gold layer. The thus assembled two sectors are clamped and irradiated with UV rays for curing the adhesive layer. The thus integrated sectors are measured for tensile shear bonding strength using a tensile strength testing machine.

TABLE 1-1

| Example | 1 | 2 | 3 |
|---|---|---|---|
| Formulation (parts by weight) | | | |
| (a) $CH_2=CCH_3-COO-CH_2CH_2-O-PO(OH)_2$ | 1 | 1 | 0.5 |
| (b) $HS-C_3H_6Si(OCH_3)_3$ | 1 | 2 | 1 |
| (c-1) Acrylate oligomer *1 | 50 | 50 | 50 |
| (c-2) Acrylate monomer *2 | 50 | 50 | 50 |
| (d) Polymerization initiator *3 | 5 | 5 | 5 |
| Bonding Strength (N/cm$^2$) at 25° C. | 250 | 260 | 250 |

TABLE 1-2

| Comparative Example | 1 | 2 | 3 |
|---|---|---|---|
| Formulation (parts by weight) | | | |
| (a) $CH_2=CCH_3-COO-CH_2CH_2-O-PO(OH)_2$ | 0 | 1 | 0 |
| (b) $HS-C_3H_6Si(OCH_3)_3$ | 0 | 0 | 1 |
| (c-1) Acrylate oligomer *1 | 50 | 50 | 50 |
| (c-2) Acrylate monomer *2 | 50 | 50 | 50 |
| (d) Polymerization initiator *3 | 5 | 5 | 5 |
| Bonding Strength (N/cm$^2$) at 25° C. | 100 | 110 | 100 |

*1: Urethane acrylate oligomer having an average molecular weight of about 2,000.
*2: A mixture of phenoxyethyl acrylate and trimethylolpropane triacrylate
*3: A mixture of 1-hydroxycylohexyl phenyl ketone and 2, 4, 6-trimethylbenzoyldiphenylphosphine oxide Metal Deterioration Test An optical disc composed of a polycarbonate substrate and an aluminum layer formed thereon by sputtering was immersed in a testing liquid shown in Table 2 and allowed to stand at 25° C. for 24 hours. Thereafter, the surface of the aluminum layer was observed to determine occurrence of deterioration thereof. Similar tests were carried out in the same manner as above, except that the test sample was immersed in the test liquid at 40° C. for 24 hours. The results are summarized in Table 2.

TABLE 2

| | Test Conditions | |
|---|---|---|
| Test Liquid | 25° C./24 hours | 40° C./24 hours |
| (a) $CH_2=CCH_3-COO-CH_2CH_2-O-PO(OH)_2$ | no change | deterioration of Al surface |
| (b-1) $HS-C_3H_6Si-(OCH_3)_3$ | no change | no change |
| (b-2) THEIC-BMPA | no change | no change |
| Mixture of (a) and (b-1) with molar ratio of (b-1):(a) of 1:1 | no change | no change |
| Mixture of (a) and (b-2) with molar ratio of (b-2):(a) of 1:1 | no change | no change |
| Mixture of (a) and (b-1) with molar ratio of (b-1):(a) of 0.25:1 | no change | deterioration of Al surface |
| Mixture of (a) and (b-2) with molar ratio of (b-2):(a) of 0.25:1 | no change | deterioration of Al surface |

EXAMPLES 2 AND 3

Example 1 was repeated in the same manner as described except that $CH_2=CCH_3-COO-CH_2CH_2-O-PO(OH)_2$ was substituted by $CH_2=CH-COO-CH_2CH_2-O-PO(OH)_2$ (Example 2) or $[CH_2=CCH_3-COO-C_2H_4-O(OCOC_5H_{10})O]_2PO(OH)$ (Example 3).

EXAMPLES 4–6

Examples 1–3 were each repeated in the same manner as described except that $HS-C_3H_6Si(OCH_3)_3$ was substituted by THEIC-BMPA.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An adhesive composition comprising:
   (a) a polymerizable (meth)acrylate compound having a phosphate group,
   (b) a thiol compound selected from the group consisting thiol compounds containing a silicon atom and isocyanuric acid compounds having a R'—SH group bonded to each of the three nitrogen atoms thereof,
   (c) a polymerizable compound having a double bond and having no phosphate group, and
   (d) a photopolymerization initiators,
   wherein said thiol compound (b) is present in an amount so that the molar ratio of the mercapto group or groups contained in the thiol compound (b) to the hydroxyl group or groups of the phosphate group or groups of said polymerizable (meth)acrylate compound (a) is in the range of 0.3:1 to 10:1, and
   wherein said polymerizable (meth)acrylate compound (a) is present in an amount of 0.1–5% by weight based on the total weight of said polymerizable (meth)acrylate compound (a) and said polymerizable compound (c).

2. An adhesive composition as claimed in claim 1, wherein said polymerizable (meth)acrylate compound (a) is represented by the following formula:

$$[CH_2=CR-COO-X-O]_m-PO(OH)_n$$

wherein R stands for a hydrogen atom or a methyl group, X stands for an organic divalent group, and m and n are integers of 1 or more with the proviso that a total of m and n is 3.

3. An adhesive composition as claimed in claim 2, wherein said organic divalent group is an alkylene group having 1–8 carbon atoms or —Y—O—CO—Z— where Y and Z stand independently for an alkylene group having 1–8 carbon atoms.

4. An adhesive composition as claimed in claim 1, wherein said polymerizable compound (c) is at least one compound selected from the group consisting of monofunctional (meth)acrylates, polyfunctional (meth)acrylates, N-vinyl-2-pyrrolidone, acryloyl morpholine, vinyl imidazole, N-vinyl caprolactam, vinyl acetate, (meth)acrylic acid, (meth)acrylamide.

5. An adhesive composition as claimed in claim 1, and being a liquid having a viscosity of 20–2,000 Cp at 25° C.

6. An adhesive composition as claimed in claim 1, wherein said thiol compound is $HS-C_3H_6Si(OCH_3)_3$ or

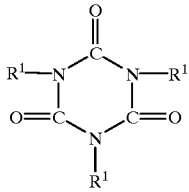

where R' is $-C_2H_4O-CO-C_2H_4SH$ (THEIC-BPMA).

7. A method of preparing an optical disc comprising:
   forming a layer of an adhesive composition according to claim 1 between a first transparent substrate having at least one optical information recording layer deposited thereon and a second transparent substrate having at least one optical information recording layer deposited thereon; and
   irradiating said adhesive composition layer with ultraviolet rays.

8. An optical disc comprising:
   a first member having a transparent substrate and at least one optical information recording layer deposited thereon;
   a second member having a transparent substrate having at least one optical information recording layer deposited thereon; and
   a layer of an adhesive composition according to claim 1 interposed between said first and second members.

9. A method of preparing an optical disc comprising:
   forming a layer of an adhesive composition according to claim 1 between a first transparent substrate having at least one optical information recording layer deposited thereon and a second transparent substrate such that said optical information recording layer is in contact with said adhesive composition layer; and
   irradiating said adhesive composition layer with ultraviolet rays.

10. An optical disc comprising a first transparent substrates, at least one optical information recording layer, an adhesive layer, and a second transparent substrate laminated in this order, said adhesive layer being a cured product of an adhesive composition according to claim 1.

* * * * *